United States Patent
Adams et al.

(10) Patent No.: US 9,013,369 B2
(45) Date of Patent: Apr. 21, 2015

(54) REMOTE DESKTOP CLIENT PEEPHOLE MOVEMENT

(75) Inventors: Neil Adams, Waterloo (CA); Herbert Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1766 days.

(21) Appl. No.: 12/182,166

(22) Filed: Jul. 30, 2008

(65) Prior Publication Data

US 2010/0026608 A1    Feb. 4, 2010

(51) Int. Cl.
*G09G 5/00* (2006.01)
*G06F 3/14* (2006.01)
*G09G 5/34* (2006.01)

(52) U.S. Cl.
CPC .............. *G06F 3/1454* (2013.01); *G09G 5/346* (2013.01); *G09G 2340/0407* (2013.01); *G09G 2340/145* (2013.01); *G09G 2370/16* (2013.01)

(58) Field of Classification Search
USPC ........................................... 345/1.1–3.4, 158
See application file for complete search history.

(56) References Cited

U.S. PATENT DOCUMENTS

| | | | |
|---|---|---|---|
| 4,642,790 A | 2/1987 | Minshull | |
| 5,999,176 A | 12/1999 | Kamper | |
| 6,411,275 B1 * | 6/2002 | Hedberg | 345/156 |
| 6,710,754 B2 * | 3/2004 | Hanson et al. | 345/2.1 |
| 6,798,429 B2 * | 9/2004 | Bradski | 345/156 |
| 2003/0169280 A1 | 9/2003 | Hsieh | |
| 2006/0069797 A1 * | 3/2006 | Abdo et al. | 709/231 |
| 2008/0150921 A1 * | 6/2008 | Robertson et al. | 345/204 |

FOREIGN PATENT DOCUMENTS

| | | |
|---|---|---|
| WO | 9738389 | 10/1997 |
| WO | 9918495 A | 4/1999 |
| WO | 0160068 A1 | 8/2001 |

OTHER PUBLICATIONS

Robbins, D.C., Cutrell, E., Sarin, R. & Horvitz, E., "Advancing Interaction: ZoneZoom: Map Navigation for Smartphones with Recursive View Segmentation", AVI'04, Gallipoli, May 2004, ACM press, p. 231-234.

European Patent Application No. 08 16 1426 Search Report mail date Apr. 29, 2009.

* cited by examiner

*Primary Examiner* — Premal Patel
(74) *Attorney, Agent, or Firm* — Perry + Currier, Inc.

(57) ABSTRACT

A method and apparatus for controlling a first display module is provided, the first display module associated with a client device in communication with a server enabled to generate data for display on a second display module having a screen size larger than a screen size of the first display module, the data having an active area. Data is received at the client device. The first display module is controlled to generate a representation of a first portion of the data including the active area, the representation of the first portion representative of a peephole superimposed on the second display module, the peephole less than or equal to a size of a screen of the first display module. Input indicative that the peephole is to be shifted to an edge of the active area is received. The first display module is controlled to generate a representation of a second portion of the data including the edge, such that the peephole is shifted to the edge of the active area.

19 Claims, 7 Drawing Sheets

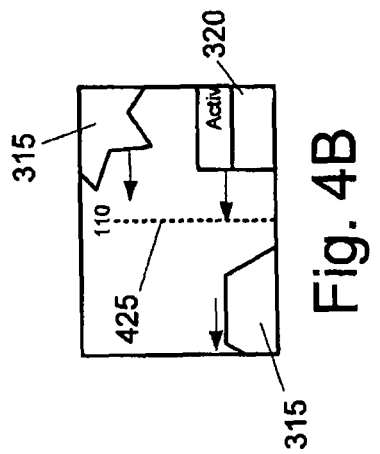
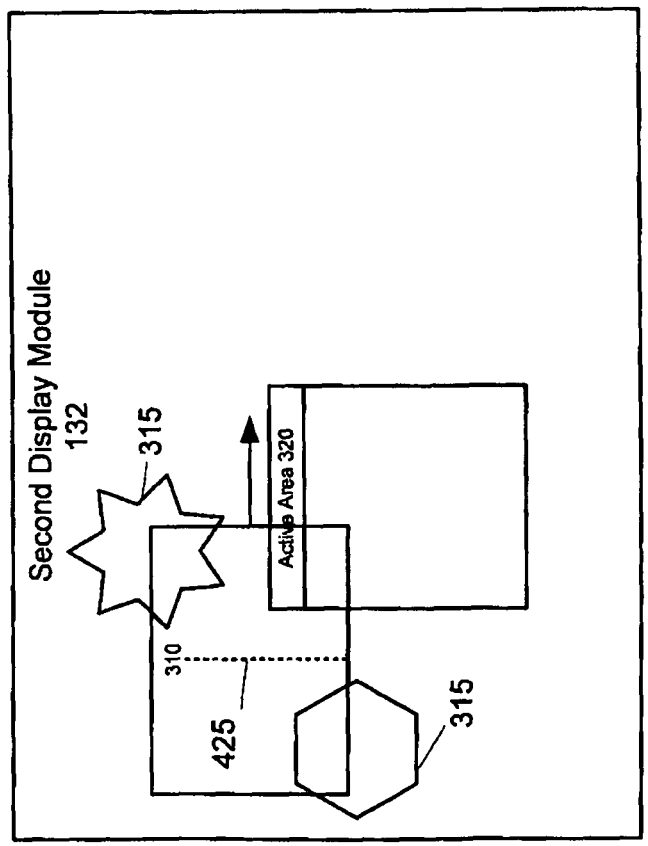
Fig. 4B
Fig. 4A

REMOTE DESKTOP CLIENT PEEPHOLE MOVEMENT

FIELD

The specification relates generally to client-server environments, and specifically to a method and apparatus for controlling a first display module, the first display module associated with a client device in communication with a server enabled to generate data for display on a second display module having a screen size larger than a screen size of the first display module, the data having an active area.

BACKGROUND

In client-server environments, remote desktop clients were designed to be used on client devices with display modules that are at least as equally large as display modules at the host server. Even if there is no display device at the host server, there is an assumption that the image that represents the data for display, generated at the client device, is generated for a display module that is of desktop size (e.g. >12"). However, challenges arise when the remote desktop client is installed at a client device having a display module that is smaller than the assumed size. For example, mobile devices generally have very small display modules (e.g. less than 3"), and generating an image to represent data meant for display on a much larger display module is challenging.

One solution is to enable a mobile device with a small display module to generate a portion of the data for display, in essence creating a peep hole into the larger host desktop window. Moving the peep hole around can be painful since navigating a large area with a trackball or thumbwheel is awkward. For example, a user may be reading a document (or contents of a window). The user starts at the top left corner and moves the peep hole from left to right for example by moving a cursor. At the end of the row/window the user must scroll across to the left margin and down one row/line. Getting to the new location is hence awkward.

One approach to this is provided in "Advancing interaction: ZoneZoom: Map navigation for smartphones with recursive view segmentation" by Robbins, D. C., Cutrell, E., Sarin, R., & Horvitz, E. (2004), and published in the proceedings of the working conference on advanced visual interfaces (AVI '04), (Gallipoli, May 2004), ACM press, 231-234. In this approach an information space is segmented into nine sub-segments, each of which is mapped to a key on the number keypad of a smartphone having a display module. The sub-segments can be chosen by the author of the information space or dynamically generated at run-time. To view a sub-segment, a user presses the appropriate button on the keypad to take advantage of "spring-loaded" view shifting, which allows users to jump between views of defined sub-segments. However, this approach is awkward if the user is unclear about what he/she wishes to view and may have to hunt between sub-segments to find the appropriate view.

BRIEF DESCRIPTIONS OF THE DRAWINGS

Embodiments are described with reference to the following figures, in which:

FIG. 4A depicts a second display module of a second size with a peephole superimposed thereupon, according to a non-limiting embodiment;

FIG. 4B depicts a first display module of a first size comprising the contents of the a second display module encompassed by the peephole of FIG. 4A, according to a non-limiting embodiment

DETAILED DESCRIPTION OF THE EMBODIMENTS

Figure 1:
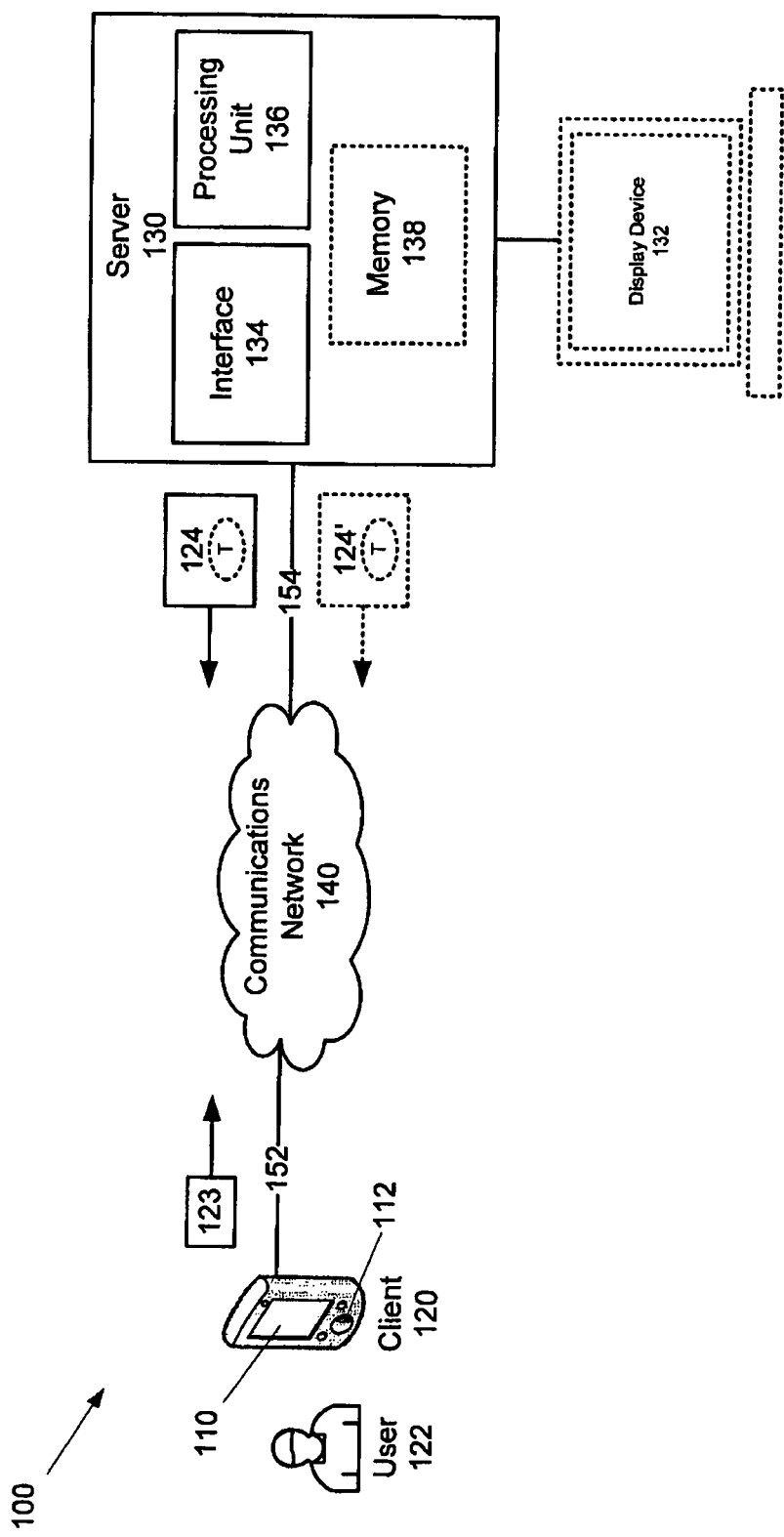
FIG. 1 depicts a system for controlling a first display module of a first size, according to a non-limiting embodiment.

A first aspect of the specification provides a method of controlling a first display module, the first display module associated with a client device in communication with a server enabled to generate data for display on a second display module having a screen size larger than a screen size of the first display module, the data having an active area. The method comprises receiving the data at the client device. The method further comprises controlling the first display module to generate a representation of a first portion of the data including the active area, the representation of the first portion representative of a peephole superimposed on the second display module, the peephole less than or equal to a size of a screen of the first display module. The method further comprises receiving input indicative that the peephole is to be shifted to an edge of the active area. The method further comprises controlling the first display module to generate a representation of a second portion of the data including the edge, such that the peephole is shifted to the edge of the active area.

The active area can comprise an active portion and the input indicative that the peephole is to be shifted to an edge of the active area can comprise input indicative that the active portion is shifting, or has shifted, to an edge of the active area. The active portion can comprise at least one of a cursor and a carat and the input can comprise a change in position of the active portion. The first portion can further comprise a second edge of the active area opposite the edge and the input indicative that the peephole is to be shifted to an edge of the active area can be acquired by detecting that the active portion is adjacent to the second edge.

The method can further comprise: receiving input from an input device associated with the client device; transmitting the input from the input device to the server such that the server can update the data; and receiving updated data comprising the input indicative that the peephole is to be shifted to the active area.

The first portion can further comprise a second edge of the active area opposite the edge and the input indicative that the peephole is to be shifted to an edge of the active area can comprise detecting a pre-defined portion of the peephole intersecting with the second edge. The edge can comprise a left margin and the second edge can comprise a right margin. The edge can comprise a right margin and the second edge can comprise a left margin.

The data can comprise a remote desktop environment and the active area can comprise an active window within the remote desktop environment.

A left edge of the representation of the second portion can be aligned with a left margin of the active area and a top of the representation of the second portion can be shifted down by at least the distance of a row from a top of the representation of the first portion.

The input can comprise input local to the client device.

The method can further comprise receiving scroll input data local to the client device and in response controlling the first display module to generate a representation of a third portion of the data, at least a subset of the third portion adjacent to the first portion, such that the active area scrolls through the peephole. The input can comprise the scroll input data.

The method can further comprise receiving window zoom out input data local to the client device, and in response controlling the first display module to generate a representation of a fourth portion of the data, the fourth portion comprising a substantial portion of the active area such that the peephole encompasses a substantial portion of the active area.

The method can further comprise desktop zoom out input data local to the client device, and in response controlling the first display module to generate a representation of a fourth portion of the data, the fourth portion comprising a substantial portion of the data such that the peephole can comprise a substantial portion of the data for display on the second display module.

The method can further comprise: determining that a change has occurred in the data; and controlling the first display module to generate a representation of a third portion of the data such that the peephole is automatically adjusted to encompass at least a portion of the change. The change can comprise generation of a dialog box.

The first display module can comprise circuitry for generating representations of images, and controlling the first display module to generate a representation of a first portion of the data and controlling the first display module to generate a representation of a second portion of the data each can comprise controlling the circuitry.

A second aspect of the specification provides a client device for controlling a first display module. The client device comprises a communication interface for communicating with a server enabled to generate data for display on a second display module with a screen size larger than a screen size of the first display module, the data having an active area, the communication interface enabled for receiving the data. The client device further comprises a processing unit enabled for controlling the first display module to generate a representation of a first portion of the data including at least a portion of the active area, the representation of the first portion representative of a peephole superimposed on the second display module, the peephole less than or equal to a size of a screen of the first display module. The processing unit is further enabled for receiving input indicative that the peephole is to be shifted to an edge of the active area. The processing unit is further enabled for controlling the first display module to generate a representation of a second portion of the data including the edge, such that the peephole is shifted to the edge. The client device can further comprise the display module and an input device for receiving the input.

FIG. 1 depicts a system 100 for controlling a first display module 110 of a first size, the first display module 110 associated with a client device 120 in communication with a server 130 enabled to generate data for display on a second display module 132 of having a screen size larger than a screen size of the first display module 110, according to a non-limiting embodiment. In general, the client device 120 is associated with a user 122. Further, the client device 120 and the server 130 are in communication via a communications network 140 and are generally enabled to operate in a client-server environment. In general, client-server environments are known to persons of skill in the art, and hence only a basic description of such is provided hereafter.

In such a client server environment, the user 120 accesses applications running on the server 120 via the client device 120 in a client-server communication session, however the client device 120 merely receives input from an input device 112 (e.g. the user 122 interacts with the input device 112) and transmits data 123 representing the input from input device 112 to the server 130, via the communications network 140. In turn, the server 130 processes the data 123 and transmits data 124 representing a view of the applications running at the server 130. If further input from input device 112 is received at the server 130, updated data 124' can be transmitted to the client device 120, the updated data 124' representing an updated view of the applications running at the server 130. While the data 124 and the updated data 124' are configured for viewing at the second display module 132 (e.g. a remote desktop environment of size of the screen of the second display module 1132), the data 124 and/or the updated data 124' can be processed for viewing at the first display module 110 in a manner described below. In this manner, the processing of applications occurs at the server 130 and the client device 120 merely acts to receive input and display a view of the applications.

The client device 120 is any type of communications device that can access applications running on the server 120 in a client-server communication session. Thus sending communication device 110 can be, for example, a desktop or laptop computer, a wireless communication device, a cellular telephone, a mobile electronics device, and/or a combination. The client device 120 is described in further detail below with reference to FIG. 2. The client device 120 connects with the communications network 140 via a link 152. Link 132 can be wired or wireless or combinations thereof. Link 152 is complementary to a communications interface 113 in the client device 120, as described below.

As one example, where the client device 120 is a desktop or laptop computer, and link 152 is wired, then link 152 can be an Ethernet link, a digital subscriber line ("DSL") link, a cable-Internet link, a fibre-optic link and/or combinations thereof.

As another example, where the client device 120 is a mobile electronic device, and link 152 is wireless, then link 152 can be, for example, based on the global system for mobile communications ("GSM"), or Code Division Multiple Access ("CDMA") and/or IEEE 802.11g (and its variants, "WiFi") and/or WiMAX and/or combinations and variants thereof.

The communications network 140, in turn, is interoperable with link 152 and able to communicate there over. The communications network 140 can be, for example, the Internet, the Public Switched Telephone Network ("PSTN"), an Intranet, a local area network, a wireless network, a cellular telephone network, a WiFi network, a WiMax network, a WLAN and/or combinations thereof.

Hence, the configuration of the communications network 140 is not particularly limited and can be based upon of any combination of known or still un-conceived network infrastructure(s) and elements that permit users to communicate with the server 130 via the client device 120, and otherwise interact from remote locations via telecommunication devices.

The server 130 generally comprises a communications interface 134 enabled for communication with the client device 120 via the communications network 140, and a processing unit 136 enabled for processing the data 123, processing applications and generating the data 124/updated data 124'. In some embodiments, the server 130 further comprises a memory 138 for storing data associated with the applications and/or the client device 120 and/or the user 112. The communications interface 134, and the processing unit 136 (and the memory 138, if present) are all in communication, for example via a computer bus as known to persons skilled in the art. The server 130 can be further enabled to participate in a plurality of client-server communication sessions, with a plurality of client devices similar to the client device 120.

The server 130 connects to the communications network 140 via link 154. Like link 152, link 154 can be wired or wireless or combinations thereof, and is complementary to the communications interface 134.

Figure 2:
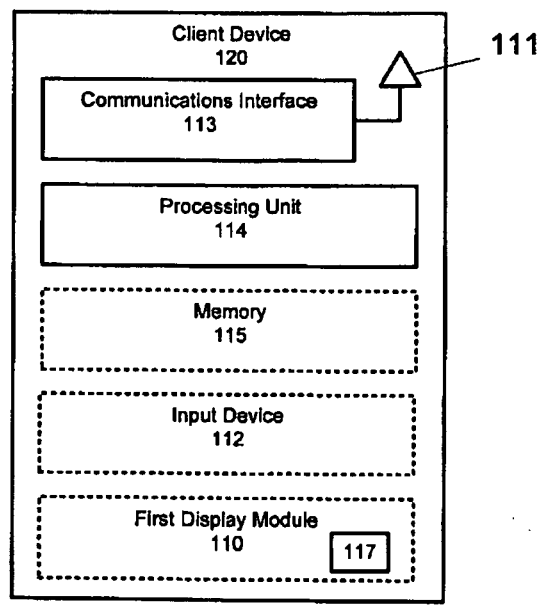
FIG. 2 depicts a client device for controlling a first display module of a first size, according to a non-limiting embodiment.

With reference to FIG. 2, which depicts a block diagram of the client device 120, according to a non-limiting embodiment, the client device 120 comprises a communications interface 113 for communication with the server 130 via the communications network 140, and a processing unit 114 enabled for processing the data 124/updated data 124' and generating the data 123. In embodiments where the client device 120 comprises a mobile electronics device, the communication interface 113 can further comprise an antenna 111. In some embodiments, the client device 120 further comprises a memory 115 for storing data associated with the client device 120 and/or the user 112. In some embodiments, the client device 120 further comprises the input device 112, however in other embodiments, the input device 112 can be, at least in part, an external device in communication with the client device 120. The input device 112 comprises any suitable input device including but not limited to a keyboard, a pointing device (e.g. a trackwheel, a trackball, a touchscreen, and the like), and/or a combination. In some embodiments, the client device 120 further comprises the first display module 110 however, in other embodiments, the first display module 110 can be, at least in part, an external device in communication with the client device 120. The display module 110 comprises any suitable display module including but not limited to a flat panel display module (LCD, plasma etc.) and/or a CRT. However, in general, the first display module 110 comprises circuitry 117 for generating representations of images (transistors, LCD cells, colour filters plasma cells, phosphors, electron beam scanning elements, etc.). The communications interface 113, and the processing unit 114, the memory 1115, the input device 112 and the display module 110 are all in communication, for example via a computer bus as known to persons skilled in the art.

In generating the data 124/updated data 124', the server 130 generally assumes that the view of the applications is to be displayed on the second display module 132 (which may or may not be actually present in the system 100) and further assumes that the screen of the first display module 110 is of a similar size to the screen of the second display module 132. However, in embodiments in the present specification, the screen of the second display module 132 is larger than the screen of the first display module 110. For example, the client device 120 can comprise a mobile electronics device such as a PDA, a cell phone and the like, and hence the first display module 110 can be significantly smaller than the second display module 132 (e.g. $\frac{1}{25}^{th}$ the size).

Figure 3B:
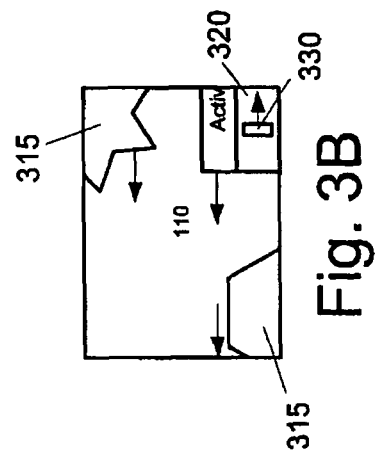
FIG. 3B depicts a first display module of a first size comprising the contents of the a second display module encompassed by the peephole of FIG. 3A, according to a non-limiting embodiment.
Figure 3A:
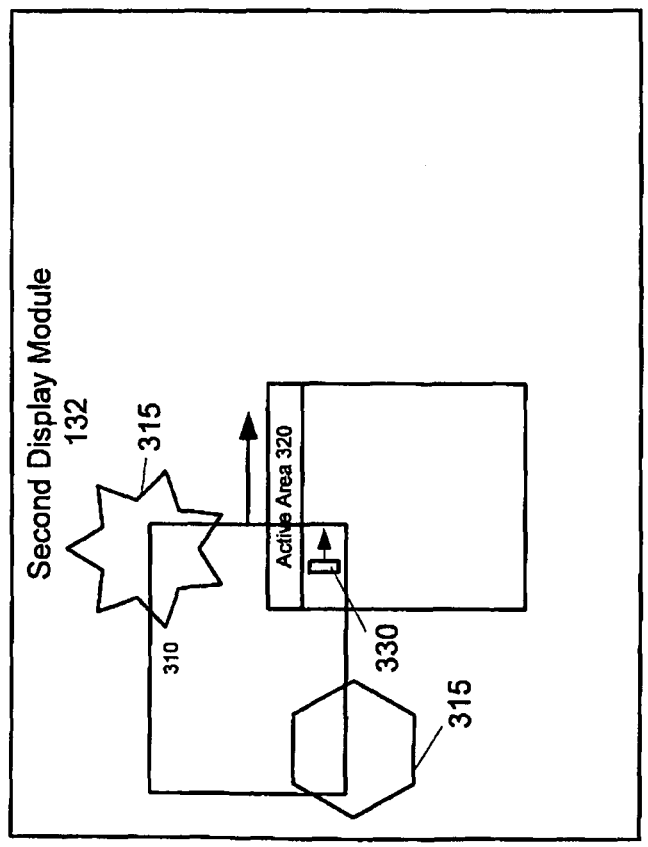
FIG. 3A depicts a second display module of a second size with a peephole superimposed thereupon, according to a non-limiting embodiment.

To address this situation, as depicted in FIGS. 3A and 3B, the client device 120 is generally enabled for controlling the first display module 110 to generate a representation of a first portion of the data 124, the representation of the first portion representative of a peephole 310 of the first size, superimposed on the second display module 132. This approach is taken as, if all the data 124/updated data 124' were displayed on the first display module 132, it would generally be too small to be legible, with only large features in the data 124 visible on the first display module 110. Hence the peephole 310 enables a portion of the data 124 to be viewed at the first display module 110, with features 315 (e.g. text, graphics etc.) displayed in the peephole 310 being of dimensions similar to features displayed at the second display module 132. The peephole 310 can then be "scanned" or "scrolled" across the data 124 to view all the features 315, with only those portions of the features 315 visible at the first display module 110 that are encompassed by the peephole 310 (e.g. as in FIG. 3B). Further, it is desirable to set the size of the peephole to about the same size as the first display module 110 (e.g., less than or equal to the size of the first display module 110), as the entirety of the contents of the peephole 310 can then be displayed at the first display module 110.

In particular, the data 124/updated data 124' can comprise a desktop environment, including but not limited to Windows™, Mac OS X™ and the like, and further comprise an active area 320, for example a window with which the user 122 is interacting. Hence, when the processing unit 114 controls the first display module 110 to generate a representation of a first portion of the data 124, the processing unit 114 can further determine which portion of the data 124 is representative of the active area 320 such that the first portion comprises at least a portion of the active area 320. Alternatively, the server 130 can determine which portion of the data 124 comprises the active area 320 and transmit the coordinates of the first portion to the client device 120, for example within the data 124. In any event, the first display module 110 is conveniently controlled to generate the representation of the data 124 which includes at least a portion of the active area 320.

In some embodiments, the peephole 310 can be scrolled via the input device 112. For example, the user 122 can actuate an actuator (e.g. a button, scroll wheel, a hot key, a trackwheel, a trackball, a touchscreen, a pointing device and/or a combination) on the input device 112 such that the processing unit 114 receives scroll input data indicative that the peephole 310 be scrolled. In response, the processing unit 114 than controls the first display module 110 to generate a representation of a second portion of the data 124, at least a subset of the second portion adjacent to the first portion, such that the active area 320 scrolls through the peephole 310 The user 122 can then manually control the scrolling of the peephole 310 via interaction with the input device 112. For example, in the embodiment depicted in FIG. 3A, the peephole 310 is scrolled left to right across the second display module 132. However, from the perspective of the user 122 viewing the first display module 110, the features 315 and the active area 320 scroll from right to left across the screen of the first display module 110.

Alternatively, in some embodiments, the active area 320 comprises an active portion 330, including but not limited to a cursor, a carat and the like. For example, the user 122 can be typing text at the input device 112, the text is transmitted to the server 130 via the data 123, and the data for display is updated at the server 130 to include the text displayed at the position of the active portion 330 prior to being transmitted to the client device 120 via the updated data 124'. In any event, the first display module 110 is controlled to generate a representation of the first portion of the data 124 including the active portion 330 of the active area 320. As the active portion 330 moves across the active area 320, for example in response to receiving input text, the processing unit 112 can be enabled to generate a representation of the second portion of the data 124, at least a subset of the second portion adjacent to the first portion and including the active portion 330, such that the active area 320 scrolls through the peephole 310 following the movement of the active portion 330. While the active portion 330 is depicted as moving from left to right across the first display module 110, it is understood that the active portion 330 can move in any suitable direction. For example, in some languages, flow of input text can proceed from right to left and/or top to bottom and/or bottom to top.

However, once the peephole 310 reaches an edge of the active area 320 in the direction of scrolling, it is generally desirable for the peephole 310 to return to the opposite edge. For example, the user 122 can be viewing and/or entering text and/or graphics in a left to right manner, the peephole 310 scrolling accordingly; when the right edge of the active area 320 is reached, the user 122 will generally want to return to the left edge of the active area 320 to continue entering/viewing text/graphics. Hence, in a non-limiting exemplary embodiment, the edge of the active area 320 in the direction of scrolling comprises either the right edge of the active area 320 and/or a right margin of the active area 320 ("right edge"). In the exemplary embodiments, the opposite edge is hence the left edge of the active area 320 and/or a left margin of the active area 320 ("left edge"). However, in other embodiments, the situation can be reversed and/or the edges can be the top and bottom edges, as desired.

In any event, in some embodiments, once the active portion 330 reaches the right edge, the active portion 330 generally wraps around to the left edge, one row/line down, such that text being entered appears on the next row/line, on the left hand side. The processing unit 114 hence receives input indicative that the peephole 310 is to be shifted to an edge of the active area 320 (i.e. the left edge), and in response controls the first display module 110 to generate a representation of a third portion of the data 124 including the active portion shifted to the left edge, and shifted down by a row/line, such that the peephole 310 is shifted to the left edge, and encompasses the active portion 330. In some embodiments, the detection of the shifting in the active portion 330 can occur at the server 130, and the client device 120 receives the input indicative that the peephole 310 is to be shifted to an edge of the active area 320 from the server 130 as a specific trigger T embedded in the data 124 and/or the updated data 124'. In other embodiments, the detection of the shift in the active portion 330 can occur at the client device 120 for example by processing the data 124 and/or the updated data 124', the data 124 and/or the updated data 124' inherently comprising the input indicative that the peephole 310 is to be shifted to an edge (i.e. the data 124 comprises the shifted active area 320).

Regardless, the user 133 entering text into the input device 112 views the text at the cursor on the first display module 110. When the cursor reaches the end of a line and wraps around to the beginning of the next line, the peephole automatically follows the cursor without the user 122 having to interrupt their flow of work to reset the position of the peephole 310 with respect to the position of the cursor. This prevents mechanical stress at the input device 112, and further reduces use of resources at the processing unit 114 as the processing unit 114 is prevented from generating unnecessary portions of the data 124.

Attention is now directed to FIGS. 4A and 4B, which are substantially similar to FIGS. 3A and 3B respectively, which like elements depicted with like numbers. FIGS. 4A and 4B depict a non-limiting example of embodiments where the peephole 310 is scrolling in response to receiving scroll input data at the input device 112, the scroll input data indicative that the peephole 310 is to be scrolled. In these embodiments, the peephole 310 can comprise a line 425, which may or may not be visible, as desired, and the processing unit 114 can be enabled to determine when the line 425 intersects with the right edge of the active area 320. In these embodiments, such an intersection represents input indicative that the peephole 310 is to be shifted to the left edge of the active area 320. While the line 425 is depicted as a vertical line, the line 425 is generally parallel to the direction of scrolling, and can hence extend in any suitable direction. Further, while the line 425 is depicted as bisecting the peephole 310, the line 425 can be located in any suitable position in the peephole 310, and the position can further be configurable, for example by the user 122.

In response, the processing unit 114 controls the first display module 110 to generate a representation of a third portion of the data 124, including the left edge of the active area 320, such that the peephole 310 is shifted to the left edge. In some embodiments, the peephole 310 encompasses the left edge, while in other embodiments, the left edge of the peephole 310 is generally aligned with the left edge, as desired. The user 112 has then to simply scroll the peephole 310 from left to right, and when the active portion 330 reaches the right edge of the active area 320, the peephole 310 automatically shifts back to the left edge of the active area 320 shifted down by a row/line, and the user 122 can continue scrolling without having to interrupt their flow of work.

Alternatively, the input device 112 can include a hotkey which, upon actuation, causes the processing unit 114 to receive the input indicative that the peephole 310 is to be shifted to an edge (i.e. the left edge) of the active area 320. The processing unit 114 then responds as described above. This enables the client device 120 to allow the user 122 to automatically move the peephole 310 from the current location to the left edge (e.g. the left margin) of the active area 320, shifted down by a line/row.

The client device 120 can comprise additional hotkeys to move the peep hole 310 to:
  1) Far left margin of the current line (of the active area 320);
  2) Far right margin of the current line (of the active area 320);
  3) Each corner of the of the current window;
  4) Far left margin of the previous line (of the active area 320);
  5) Far right margin of the next line (of the active area 320), for example if the user is reading right to left;
  6) Far right margin of the previous line (of the active area 320).

In further embodiments, the client device 120 can comprise additional hotkeys to control the first display module 110 to generate a view of the peephole 310 which:
  1) Encompasses a substantial portion of the active area 320 (e.g. the peephole 310 enters a window zoom out mode upon receipt of window zoom out input data); and/or
  2) Encompasses a substantial portion of the data 124 (e.g. the peephole 310 enters a desktop zoom out mode upon receipt of desktop zoom out input data).

Figure 5:
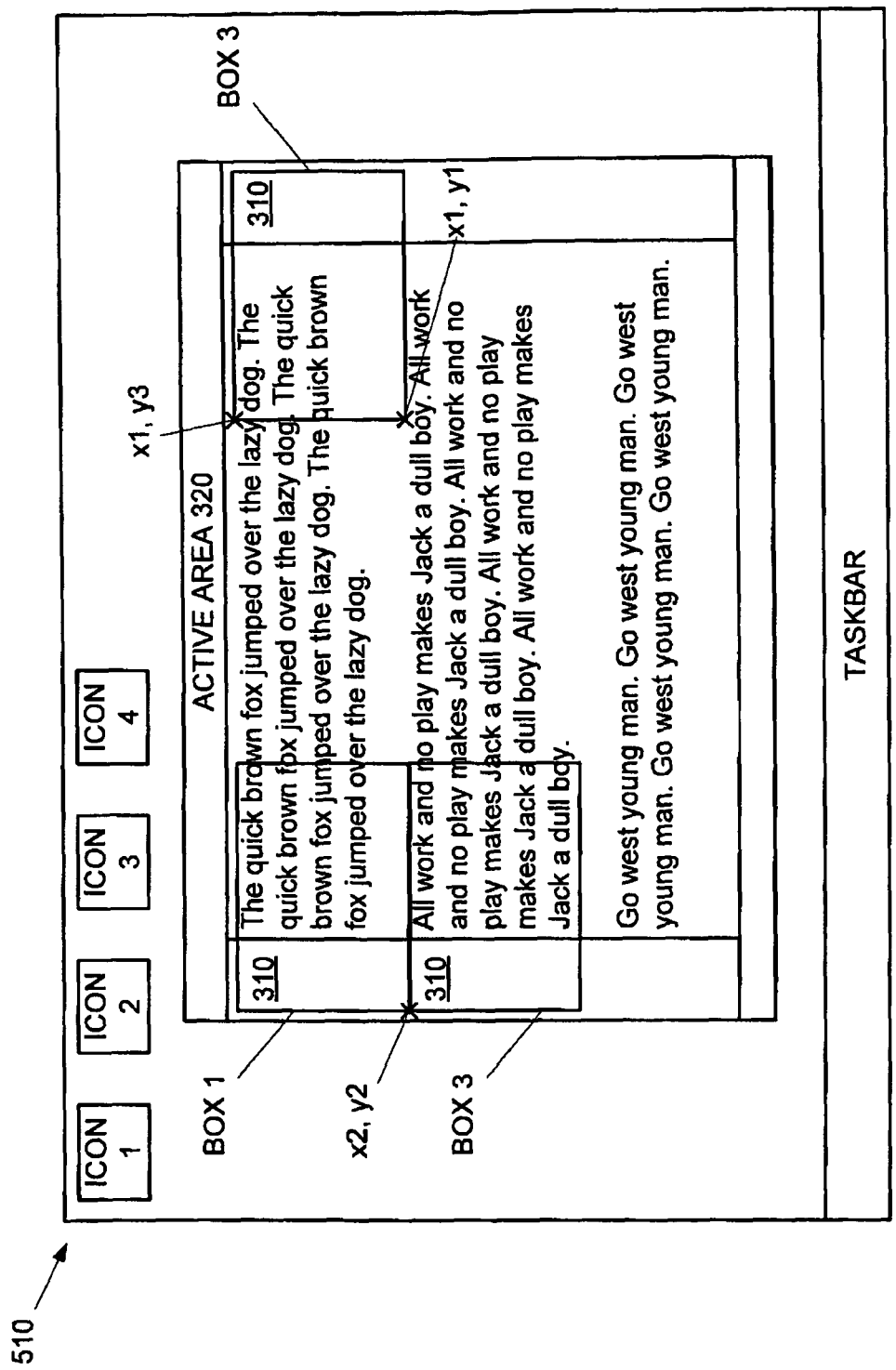
FIG. 5 depicts a view of a remote desktop environment with a peephole superimposed thereupon, according to a non-limiting embodiment.

With reference to FIGS. 1 and 5, which depicts a view of a remote desktop environment 510, in a particular non-limiting embodiment, the system 100 further comprises a virtual channel application running at the server 130 (e.g. a remote desktop environment 510 displaying various icons and an active area 320, such as an open window). The client device 120 receives the entire remote desktop image in the data 124, but is unable to determine the location of windows or other features through the remote desktop protocol: for the most part the client device 120 controls the display module 110 to display information and transmits input events in the data 123 to the server 130. However, the remote desktop does not know anything about the peephole 310 that the client device 120 is displaying to the user 122 via controlling the display module 110.

The particular non-limiting embodiment is enabled as follows:

1) The client device 120 opens up a remote desktop connection with the server 130, e.g. via the communications network 140. The client device 120 also provides virtual channel names to the server 130. The server 130 further comprises a virtual channel application (e.g. stored in the memory 138 and processed by the processing unit 136) which opens a connection to the client device 120 through a virtual channel.

2) The virtual channel application monitors the windows open on the remote desktop environment 510 and pushes the dimensions and location of the currently focused window (i.e. the active area 320) to the client device 130 whenever the window focus changes.

3) The peephole 310 initially displays the contents of Box 1, and the peephole 310 scrolls from left to right until the peephole 310 displays the contents of Box 2, whose bottom left coordinates are (x1, y1) and whose top left coordinates are (x1, y3).

4) The user 122 wishes to continue reading the document on the next line so he presses the appropriate hotkey.

5) As the client device 120 knows the current location of the peephole 310, as well as the dimensions and location of the foreground window/active area 320 (as pushed by the virtual channel application) and is therefore able to calculate the new location of the peephole 310 such that the peephole 310 displays the contents of Box 3, where the top left corner has coordinates: (x2=left margin, y2=y1).

6) The client device 120 then controls the display device 110 to generate a representation of that section of the remote desktop environment 510. The client device 120 does not have to wait for the server 130 before moving the peephole 310 since the virtual channel application has been pushing any window focus changes to the client device 120.

While this particular non-limiting embodiment does not include any overlap between the bottom of Box 2 and the top of Box 3, in other embodiments, the top of Box 3 and the bottom of Box 2 can overlap, as can the top of Box 3 and the bottom of Box 1. For example, attention is directed to FIG. 7 which is substantially similar to FIG. 6 with like elements having like numbers, but the top of Box 3 overlaps with the bottom of Boxes 1 and 2 by an amount 710. The amount of overlap 710 can be configured at the client device 120 and can include any suitable amount of overlap. For example if the user 122 is reading text a lot of overlap may be desired: e.g. the top of Box 3 may be shifted down by a line/row from the top of Box 2, such that top left corner of Box 3 has coordinates: (x2=left margin, y2'=y3-(dimension of a line/row)).

While these particular non-limiting embodiments have been described with reference to a remote desktop connection and virtual channel application, the system 100 may also comprise any other suitable virtual communications standard, including but not limited to a virtual private network (VPN).

Figure 6:
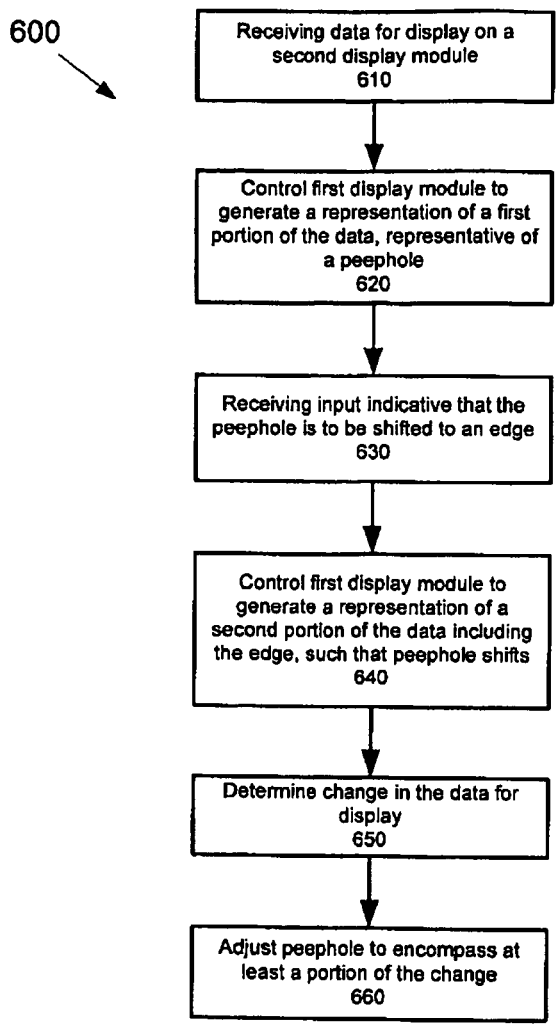
FIG. 6 depicts a method for controlling a first display module of a first size, according to a non-limiting embodiment.
Figure 7:
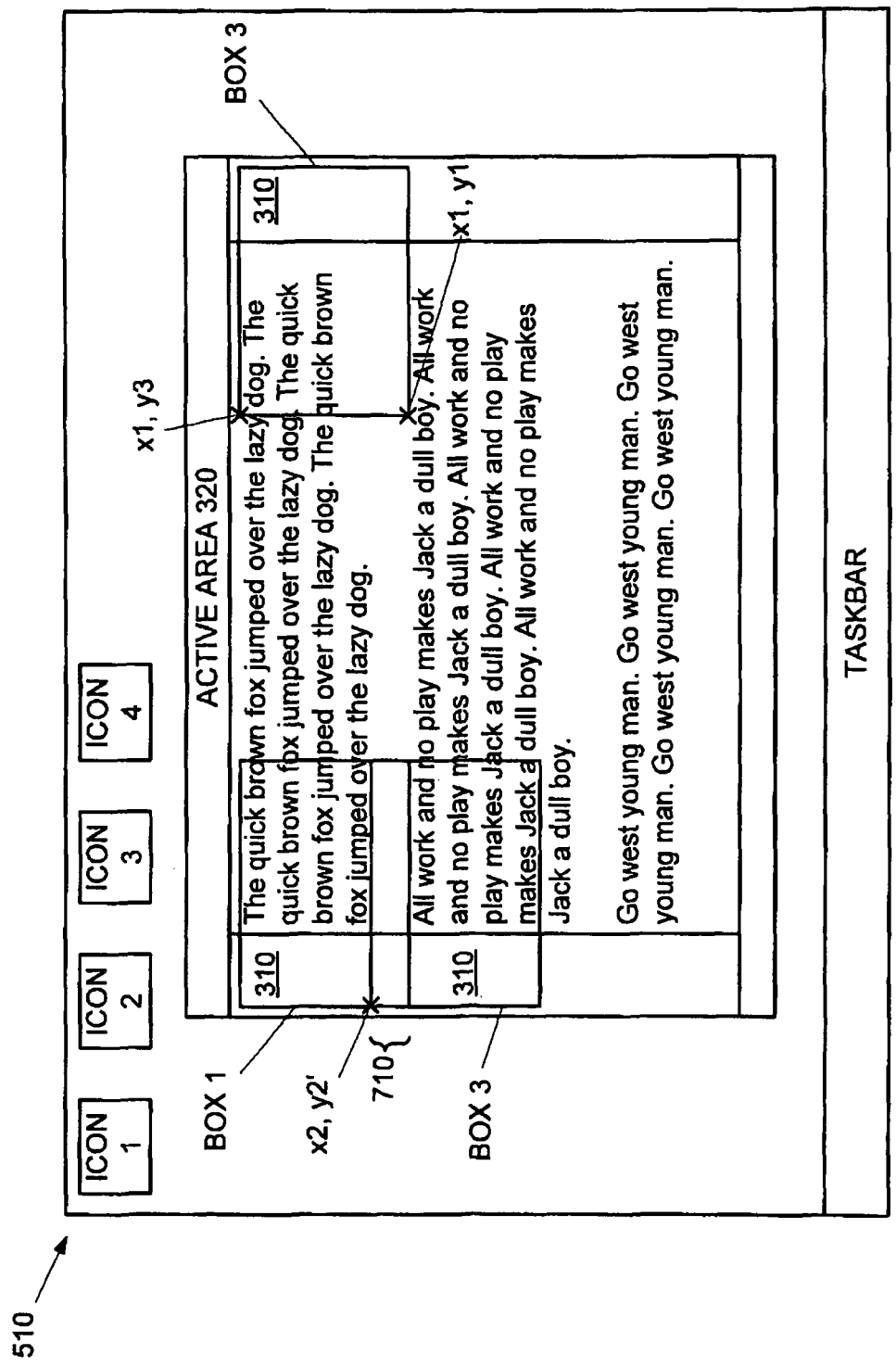
FIG. 7 depicts a view of a remote desktop environment with a peephole superimposed thereupon, according to a non-limiting embodiment.

Attention is now directed to FIG. 6 which depicts a method 600 of controlling a first display module, the first display module associated with a client device in communication with a server enabled to generate data for display on a second display module having a screen size larger than a screen size of the first display module, the data having an active area. In order to assist in the explanation of the method 600, it will be assumed that the method 600 is performed using the system 100. Furthermore, the following discussion of the method 600 will lead to a further understanding of the system 100 and its various components. However, it is to be understood that the system 100 and/or the method 600 can be varied, and need not work exactly as discussed herein in conjunction with each other, and that such variations are within the scope of present embodiments.

At step 610, the data 124 for display is received at the client device 120, for example from the server 130, as described above, the data 124 for display configured for display at the second display module 132, the second display module 132 having a screen size larger than a screen size of the first display module 110.

At step 620, the processing unit 114 controls the first display module 110 to generate a representation of a first portion of the data 124 including at least a portion of the active area 320, the representation of the first portion representative of the peephole 310 superimposed on the second display module 132, the peephole 310 less than or equal to a size of a screen of the first display module 110. In general controlling the first display module 110 to generate a representation of a first portion of the data comprises controlling the circuitry for generating representations of images within the first display module 110.

At step 630, the processing unit 114 receives input indicative that the peephole 310 is to be shifted to an edge of the active area 320. In some embodiments the input may comprise a trigger T embedded in the data 124 and/or the updated data 124' (e.g. the server 130 is enabled to determine that the active portion 330 is shifting or has shifted and triggers the client device 130 to adjust the peephole 310 accordingly).

In other of these embodiments, the input may comprise a change in the data 124 and/or a difference between the data 124 and the updated data 124'. For example, the client device 130 may be enabled to determine that the active portion 330 has shifted by processing the data 124 and/or updated data 124' as it arrives at the client device 130, the input indicative that that the peephole 310 is to be shifted to an edge comprising the difference/change, as desired. For example, the client device 130 may be enabled to process images and determine differences/changes in images. Hence by processing the data 124 and/or updated data 124', a comparison can be made to determine if the active portion is shifted or has shifted.

In other embodiments, the client device 130 may receive input from the input device 112, the input indicative that that the peephole 310 is to be shifted to an edge, the input from the input device 112 further enabled to trigger the shift.

In yet further embodiments, the client device 130 may be enabled to process the intersection between the line 425 and the active area 320, the input indicative that that the peephole 310 is to be shifted to an edge comprising the intersection between the line 425 and the right edge of the active area 320.

At step 640, the processing unit 114 controls the first display module to generate a representation of a second portion of the data 124 (and/or the updated data 124) including the edge, such that the peephole 310 is shifted to the edge, for example to the left edge. In some embodiments, the peephole 310 is further offset downwards by the distance of a line/row upon shifting to the edge, or by any other suitable distance. In general controlling the first display module 110 to generate a representation of a second portion of the data comprises controlling the circuitry for generating representations of images within the first display module 110.

In some embodiments, at step 650, the system 100 is further enabled to determine that a change has occurred in the data 124 for display. For example, the server 130 may be enabled to determine that a change has occurred, by virtue of generating the updated data 124'. The server 130 may then transmit the coordinates of the change to the processing unit 114 within the data 124 and/or the data 124', for example via the trigger T. In other embodiments, the processing unit 114 is enabled to determine that a change has occurred by processing the data 124 and the updated data 124'. In some of these embodiments, the change comprises generation of a dialog box displayed on the remote desktop environment 510 of FIG. 5.

In response, at step 660, the processing unit 114 controls the first display module 110 to generate a representation of a third portion of the data such that the peephole 310 is automatically adjusted to encompass at least a portion of the change. In this manner, if a dialog box appears in the remote desktop environment, but in an area that is not visible within the peephole 310, the first display module 110 is automatically controlled to display the dialog box. In some embodiments, preferences may such that only certain changes are automatically displayed. For example, the remote desktop environment 510 may comprise a clock, and it is not practical to display the clock whenever a change in the display of the clock occurs (e.g. every second, every minute and/or every hour). Hence, when a change occurs, the processing unit 114 and/or the server 130 may be enabled to check the preferences to determine if the preferences comprise the change. For example, the preferences may indicate that peephole 310 is to be automatically adjusted when dialog boxes are generated or only dialog boxes associated with the active area 320. Other preferences may occur to a person of skill in the art and are within the scope of present embodiments. Further steps 650 and 660 may occur independent of steps 610-640, in parallel with steps 610-640 and/or after steps 610-640.

Those skilled in the art will appreciate that in some embodiments, the functionality of the client device 120 and the server 130 may be implemented using pre-programmed hardware or firmware elements (e.g., application specific integrated circuits (ASICs), electrically erasable programmable read-only memories (EEPROMs), etc.), or other related components. In other embodiments, the functionality of the client device 120 and the server 130 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of controlling a first display module, the first display module associated with a client device having a remote desktop connection to a server configured to generate a desktop image for display on a second display module having a screen size larger than a screen size of the first display module, said desktop image having an active area and an activity within said active area, the method comprising, receiving said desktop image at said client device;

controlling the first display module to generate a representation of a first portion of the desktop image including said active area, said representation of said first portion representative of a peephole superimposed on the second display module for tracking said activity, said peephole less than a size of a screen of the first display module, said activity comprising receiving input text in said active area such that said the active area scrolls through the peephole following the movement of the input text; and when said peephole reaches a first edge of said active area, automatically controlling the first display module to generate a representation of a second portion of the desktop image including a second edge of said active area, said second edge opposite said first edge, such that said peephole is automatically shifted to said second edge of said active area so as to continue tracking said activity.

2. The method of claim 1, wherein said active portion further comprises at least one of a cursor and a carat.

3. The method of claim 1, further comprising receiving input from an input device associated with the client device, transmitting said input from said input device to said server such that said server can update said desktop image, and receiving an updated desktop image comprising said input indicative that said peephole is to be shifted to said active area.

4. The method of claim 1, wherein said first edge comprises a left margin and said second edge comprises a right margin.

5. The method of claim 1, wherein said first edge comprises a right margin and said second edge comprises a left margin.

6. The method of claim 1, wherein said active area comprises an active window within a remote desktop environment.

7. The method of claim 1, further comprising shifting a top of said representation of said second portion down by at least the distance of a row from a respective top of said representation of said first portion.

8. The method of claim 1, further comprising receiving scroll input data local to the client device and in response controlling the first display module to generate a representation of a third portion of the desktop image, at least a subset of said third portion adjacent to said first portion, such that said active area scrolls through said peephole.

9. The method of claim 1, further comprising receiving window zoom out input data local to the client device, and in response controlling the first display module to generate a representation of a fourth portion of the desktop image, said fourth portion comprising a substantial portion of said active area such that said peephole encompasses a substantial portion of said active area.

10. The method of claim 1, further comprising desktop zoom out input data local to the client device, and in response controlling the first display module to generate a representation of a fourth portion of the desktop image, said fourth portion comprising a substantial portion of said desktop image such that said peephole comprises a substantial portion of the desktop image for display on the second display module.

11. The method of claim 1, further comprising:
determining that a change has occurred in said desktop image; and
controlling the first display module to generate a representation of a third portion of the desktop image such that said peephole is automatically adjusted to encompass at least a portion of said change.

12. The method of claim 11, wherein said change comprises generation of a dialog box.

13. The method of claim 1, wherein said first display module comprises circuitry for generating representations of images, and controlling the first display module to generate a representation of a first portion of the desktop image and controlling the first display module to generate a representation of a second portion of the desktop image each comprises controlling said circuitry.

14. The method of claim 1, further comprising shifting an edge of said representation of said second portion by at least a distance of a row from a respective equivalent edge of said representation of said first portion such that said peephole is automatically shifted to said second edge of said active area and by said distance of said row so as to continue tracking said activity.

15. A client device for controlling a first display module comprising
a communication interface for communicating with a server in a remote desktop connection, said server configured to generate a desktop image for display on a second display module with a screen size larger than a screen size of the first display module, said desktop image having an active area and an activity within said active area, the communication interface configured for receiving said desktop image; and
a processing unit configured to:
control the first display module to generate a representation of a first portion of the desktop image including at least a portion of the active area, said representation of said first portion representative of a peephole superimposed on the second display module for tracking said activity, said peephole less than a size of a screen of the first display module, said activity comprising receiving input text in said active area such that said the active area scrolls through the peephole following the movement of the input text; and,
when said peephole reaches a first edge of said active area,
automatically control the first display module to generate a representation of a second portion of the desktop image including a second edge of said active area, said second edge opposite said first edge, such that said peephole is automatically shifted to said second edge so as to continue tracking said activity.

16. The client device of claim 15, further comprising said display module and an input device for receiving input.

17. The client device of claim 15, wherein the processing unit is further configured to: shift an edge of said representation of said second portion by at least a distance of a row from a respective equivalent edge of said representation of said first portion such that said peephole is automatically shifted to said second edge of said active area and by said distance of said row so as to continue tracking said activity.

18. A computer program product, comprising a non-transitory computer usable medium having a computer readable program code adapted to be executed to implement a method of controlling a first display module, the first display module associated with a client device having a remote desktop connection to a server configured to generate a desktop image for display on a second display module having a screen size larger than a screen size of the first display module, said desktop image having an active area and an activity within said active area, the method comprising:
receiving said desktop image at said client device;
controlling the first display module to generate a representation of a first portion of the desktop image including said active area, said representation of said first portion representative of a peephole superimposed on the second display module for tracking said activity, said peephole less than a size of a screen of the first display module, said activity comprising receiving input text in said active area such that said the active area scrolls through the peephole following the movement of the input text; and,
when said peephole reaches a first edge of said active area
automatically controlling the first display module to generate a representation of a second portion of the desktop image including a second edge of said active area, said second edge opposite said first edge, such that said peephole is automatically shifted to said second edge of said active area so as to continue tracking said activity.

19. The computer program product of claim 18, wherein the method further comprises shifting an edge of said representation of said second portion by at least a distance of a row from a respective equivalent edge of said representation of said first portion such that said peephole is automatically shifted to said second edge of said active area and by said distance of said row so as to continue tracking said activity.

\* \* \* \* \*